(12) United States Patent
Graham et al.

(10) Patent No.: US 6,592,797 B2
(45) Date of Patent: Jul. 15, 2003

(54) METHOD AND APPARATUS TO REDUCE GALLING IN A MOLD DEVICE

(75) Inventors: Leonard C. Graham, Cave Creek, AZ (US); James D. Wicklund, Mesa, AZ (US)

(73) Assignee: The Tech Group, Inc., Scottsdale, AZ (US)

( * ) Notice: Subject to any disclaimer, the term of this patent is extended or adjusted under 35 U.S.C. 154(b) by 209 days.

(21) Appl. No.: 09/894,449

(22) Filed: Jun. 28, 2001

(65) Prior Publication Data

US 2003/0006532 A1 Jan. 9, 2003

(51) Int. Cl.⁷ .............................................. B29C 45/44
(52) U.S. Cl. ........................ 264/318; 249/59; 425/556; 425/DIG. 58
(58) Field of Search .............................. 264/318, 328.1; 249/59; 425/DIG. 58, 556

(56) References Cited

U.S. PATENT DOCUMENTS

| | | | |
|---|---|---|---|
| 3,481,000 A | 12/1969 | Barfuss | |
| 3,482,815 A | 12/1969 | Naturale | 249/180 |
| 4,059,249 A | 11/1977 | Galer | 249/58 |
| 4,079,475 A | 3/1978 | Thompson | |
| 4,541,605 A | 9/1985 | Kubota et al. | 249/142 |
| 4,756,865 A * | 7/1988 | von Holdt | 264/334 |
| 5,135,700 A | 8/1992 | Williams et al. | 264/318 |
| 5,383,780 A | 1/1995 | McCready et al. | 425/552 |
| 5,403,179 A | 4/1995 | Ramsey | 425/577 |
| 5,421,717 A | 6/1995 | Hynds | 425/556 |
| 5,518,679 A | 5/1996 | Junk | 264/318 |
| 5,565,223 A | 10/1996 | McCready et al. | 425/556 |
| 5,624,694 A | 4/1997 | Delaby et al. | 425/577 |
| 5,731,014 A | 3/1998 | Travaglini | 425/190 |
| 5,776,521 A | 7/1998 | Wright et al. | 425/556 |
| 5,798,074 A | 8/1998 | McCready et al. | 264/318 |
| 5,958,321 A | 9/1999 | Schoelling et al. | 264/318 |
| 6,079,973 A | 6/2000 | Manera et al. | 425/556 |
| 6,086,812 A | 7/2000 | Crampton et al. | 264/328.1 |
| 6,099,785 A | 8/2000 | Schweigert et al. | 264/328.1 |
| 6,177,041 B1 * | 1/2001 | Bietzer | 264/318 |
| 6,426,030 B1 * | 7/2002 | Julian | 264/318 |
| 6,450,797 B1 * | 9/2002 | Joseph | 425/556 |

* cited by examiner

Primary Examiner—Jill L. Heitbrink
(74) Attorney, Agent, or Firm—Snell & Wilmer L.L.P.

(57) ABSTRACT

The invention generally discloses an apparatus and method for removing threaded, molded articles from an injection mold. A cam system and linear drive/following gear mechanism engages a finely resolved retraction of a threaded mold core, under substantially full mold clamp pressure, prior to rotational disengagement of the core from the molded article. The invention also describes a system for the reduction of galling that may otherwise occur when mold components experience relative rotation with respect to each other. Moreover, the invention describes an apparatus and method for substantially reducing periodic maintenance checks and interruptions in production.

13 Claims, 13 Drawing Sheets

METHOD AND APPARATUS TO REDUCE GALLING IN A MOLD DEVICE

FIELD OF THE INVENTION

This invention generally relates to the field of injection molding. More specifically, the present invention relates to the reduction of galling between mold components as they experience rotation relative to one another. In yet a further specific aspect, the present invention describes an improved method and apparatus for the manufacture of articles having internally disposed threads in which a thread-forming core is at least partially disengaged from the molded article under substantially full mold clamp pressure.

BACKGROUND OF THE INVENTION

The art of forming internally threaded plastic injection molded closures is generally well known in the industry. Injection molds of this type typically include a female mold housing which substantially surrounds at least a partially threaded core component. The mold cavity is generally defined by the void space between a female mold housing and an internally disposed core component. Molten plastic material is usually injected into the mold cavity to form the threaded article. After injection and molding of the plastic, coolant may then be introduced to circulate through channels in various mold components in order to accelerate cooling of the product article. Once the article has cooled, a general feature of injection mold systems is the application of an ejection mechanism for removal of the article. Because a plastic injection mold generally has a plurality of mold cavities, it is often generally the case that the ejection mechanism operates to dislodge the articles in a group for each product cycle of the mold.

In the case of prior art methods of forming and ejecting threaded, molded products, the female mold half and mold core half are separated to initiate removal of the article from the mold. Because of the engaging nature of the threads however, the article generally remains connected to the face of the stripper ring upon separation of the mold halves. Accordingly, an ejection mechanism is generally required for subsequent removal of the article from the outer surface of the mold core.

Depending on the design parameters of the thread-molded article, the product may be removed from the mold core in various ways. These parameters may vary according to the type of plastic used to form the article as well as the number and type of threads to be formed. If the molded article is flexible, and the thread type permits, the article may be removed from the threaded core by the action of a stripper ring. In this process, the plastic should be sufficiently resilient and elastic to return to its original conformation, within a specified tolerance, after the formed threads have been stretched over the threaded core during extraction. If the polymer material is not flexible, or if the thread profile is very deep, very thin or has a more cantilevered shape, stripping may damage the article. An additional complication may occur when the thread-molded product has inherently delicate features, such as a tamper evident ring, which may experience strip-ejection damage even if an otherwise suitable polymer were to be used.

Additional prior art methods and devices for removing internally threaded articles from a mold include, for example, separation of the mold halves prior to disengagement of the article from the threaded mold core. These methods generally involve first separating the mold halves and then rotating the threaded-core while a stripper grabber ring engages the molded article and translates axially along the core in timed relation to the rotation and pitch of the threaded core. In this regard, the stripper ring may often have structural features known as grabbers to hold the molded article and prevent it from turning with the rotation of the threaded core. Such methods generally known in the art, however, have previously been applied to mold timing cycles where rotational removal of the article is accomplished only after the article has suitably cooled and the mold halves have been separated. For example, in U.S. Pat. No. 5,421,717 to Hynds, incorporated herein by reference, a moveable ejection mechanism, including a camming mechanism, which engages a stripper ring, is used to remove the article from the mold in an open-clamp configuration after the mold halves are separated.

On the other hand, U.S. Pat. No. 4,130,264 to Schroer, incorporated herein by reference, discloses an apparatus in which a plurality of thread-forming components are peripherally disposed around the core which translate on tracks to cause the core to collapse so that the thread-molded article may be pushed off. However, the collapse and expansion of the core in this device adds substantially to the overall complexity and cost of the injection mold apparatus as well as the production cycle time between mold injections. Additionally, the collapse of the core is typically engaged only after the additional step of separating the mold halves.

In the case of the manufacture of a tamper evident ring, U.S. Pat. No. 4,155,698 to Aichinger, incorporated herein by reference, generally discloses a device in which a first female cavity component surrounds a threaded component and is removed from the molded closure while a second female component adjacent to the tamper evident ring remains in place. However, this method, while generally effective, is uniquely adapted for the production of molded caps having an integral tamper evident ring and also typically includes separation of the mold halves prior to disengagement of the article.

Alternatively, when using a polymer which is generally too inflexible to be ejected by the action of a stripper ring without permanent stripping damage to the article, a method disclosed in U.S. Pat. No. 4,625,227 to Hara, incorporated herein by reference, may be used. In the '227 patent to Hara, a rotationally displaced chuck is engaged over the molded article after the female component of the mold cavity is removed. The chuck engages the outer edge of the closure and rotates the closure as it translates backward to allow the rotational removal of the unscrewing article. This method, however, is often applied in mold timing cycles where the mold is separated prior to rotational removal of the article.

Thus, a need exists in the injection molding art for a method and apparatus for the molding and ejection of threaded articles in which the injection cycle time is substantially reduced while simultaneously preserving the thread integrity of the articles. As such, the need exists for a device capable of realizing a reduced in-mold product cooling time, the commencement of resolved rotational disengagement of the article from the threaded mold core under substantially full mold clamp pressure, and the achievement of a greater number of injection production cycles between periodic inspection and maintenance checks.

SUMMARY OF THE INVENTION

The present invention generally relates to the production and removal of threaded, molded articles from a plastic injection mold device. Articles having internally disposed threads are created by a thread-forming core, which may be rotationally disengaged from the article under substantially full mold clamp pressure. A cam system and linear drive/following gear mechanism are employed to engage a finely resolved retraction of the threaded core under substantially full mold clamp pressure prior to substantially complete rotational disengagement of the threaded core from the product article and subsequent separation of the mold halves.

Specifically, the mold halves are brought together to a closed-mold position to create a mold cavity for receiving molten plastic with the core in the set position. As plastic is injected into the mold, the liquid plastic fills the cavity to form the product part. The product part may then be partially cooled in preparation for removal from the mold. Thereafter, a linear drive system is engaged to partially retract the threaded core away from the metal-to-metal contact areas of the shutoffs under substantially full mold clamp pressure. After the threaded core is subsequently disengaged from the product part, still under substantially full mold clamp pressure, the mold halves are opened to expose the part for ejection from the mold. The molded part is then ejected, the mold halves are returned to a closed position, the cores are re-set and the mold is readied for the next production cycle. While the timing and order of these steps may be varied, many of the steps may occur substantially simultaneously at various points in the mold cycle, to reduce or otherwise optimize the production cycle time.

The present invention is additionally directed to reducing galling that may otherwise occur when mold components experience rotation with respect to each other without initial retraction of the core under pressure in closed-mold configurations. Moreover, the need for periodic maintenance and incident interruption of production is substantially reduced as well.

BRIEF DESCRIPTION OF EXEMPLARY DRAWINGS

The above and other features and advantages of the present invention are hereinafter described in the following detailed description of illustrative embodiments to be read in conjunction with the accompanying drawings and figures, wherein like reference numerals are used to identify the same or similar apparatus parts and/or method steps in the similar views and:

Figure 12:
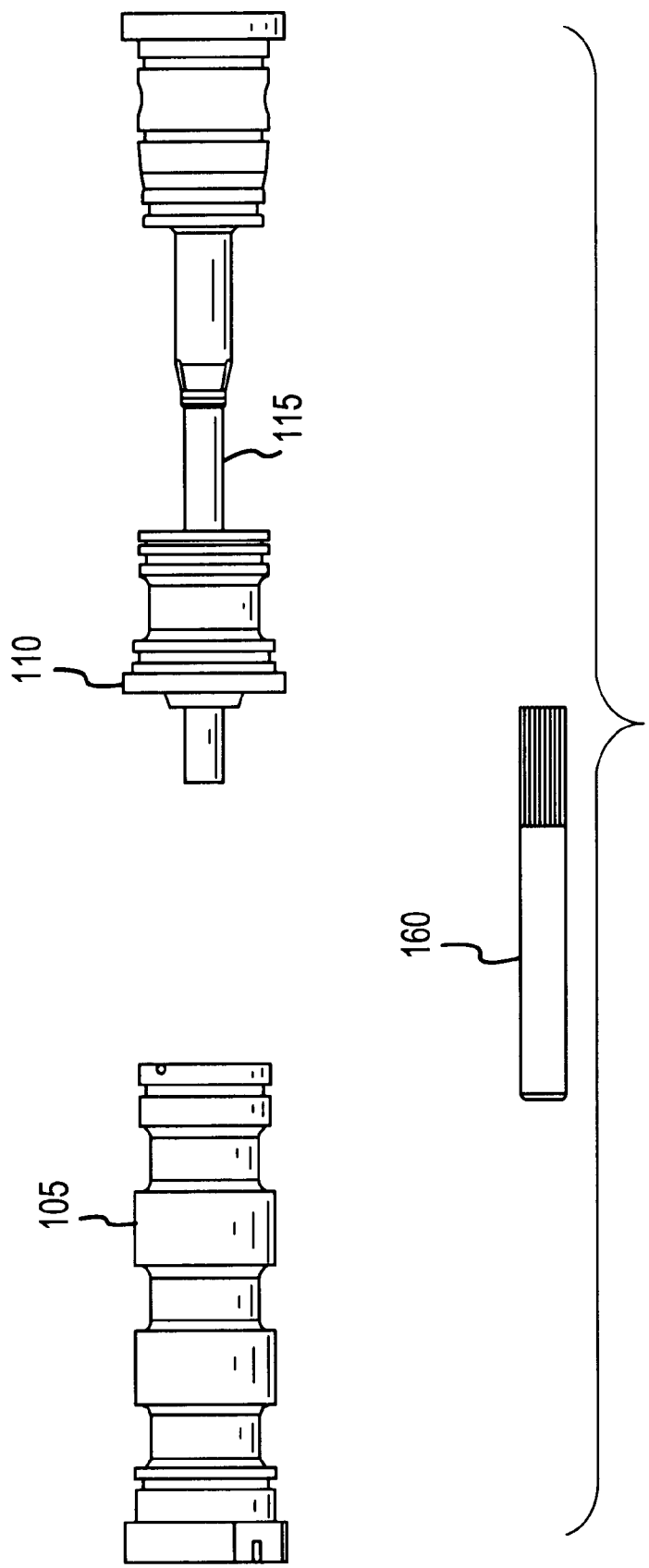

FIG. 12 is a plan view of mold components generally comprising an exemplary molding apparatus in accordance with one aspect of the present invention wherein stripper ring 110 is displaced to the stripping position for the dislodgment of article 160 from main core 115.

Figure 13:
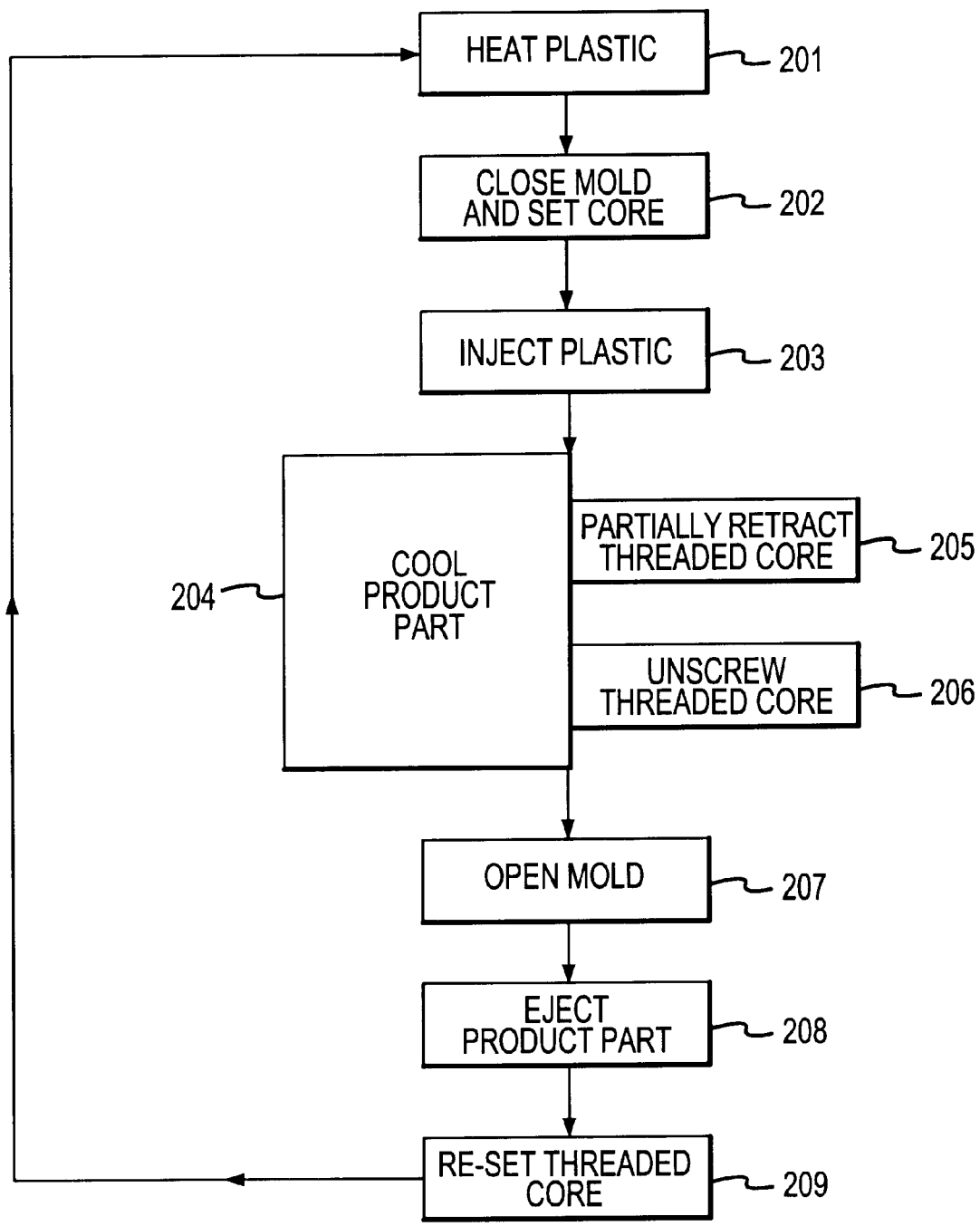

FIG. 13 is a process schematic generally depicting the sequence of method steps for an exemplary mold production cycle according to one aspect of the present invention.

Other aspects and features of the present invention will be more fully apparent from the detailed description that follows.

DETAILED DESCRIPTION OF EXEMPLARY EMBODIMENTS

The following descriptions are of exemplary embodiments of the invention only, and are not intended to limit the scope, applicability or configuration of the invention in any way. Rather, the following description is intended to provide convenient illustrations for implementing various embodiments of the invention. As will become apparent, various changes may be made in the function and arrangement of the elements described in these embodiments without departing from the spirit and scope of the invention.

Figure 1:
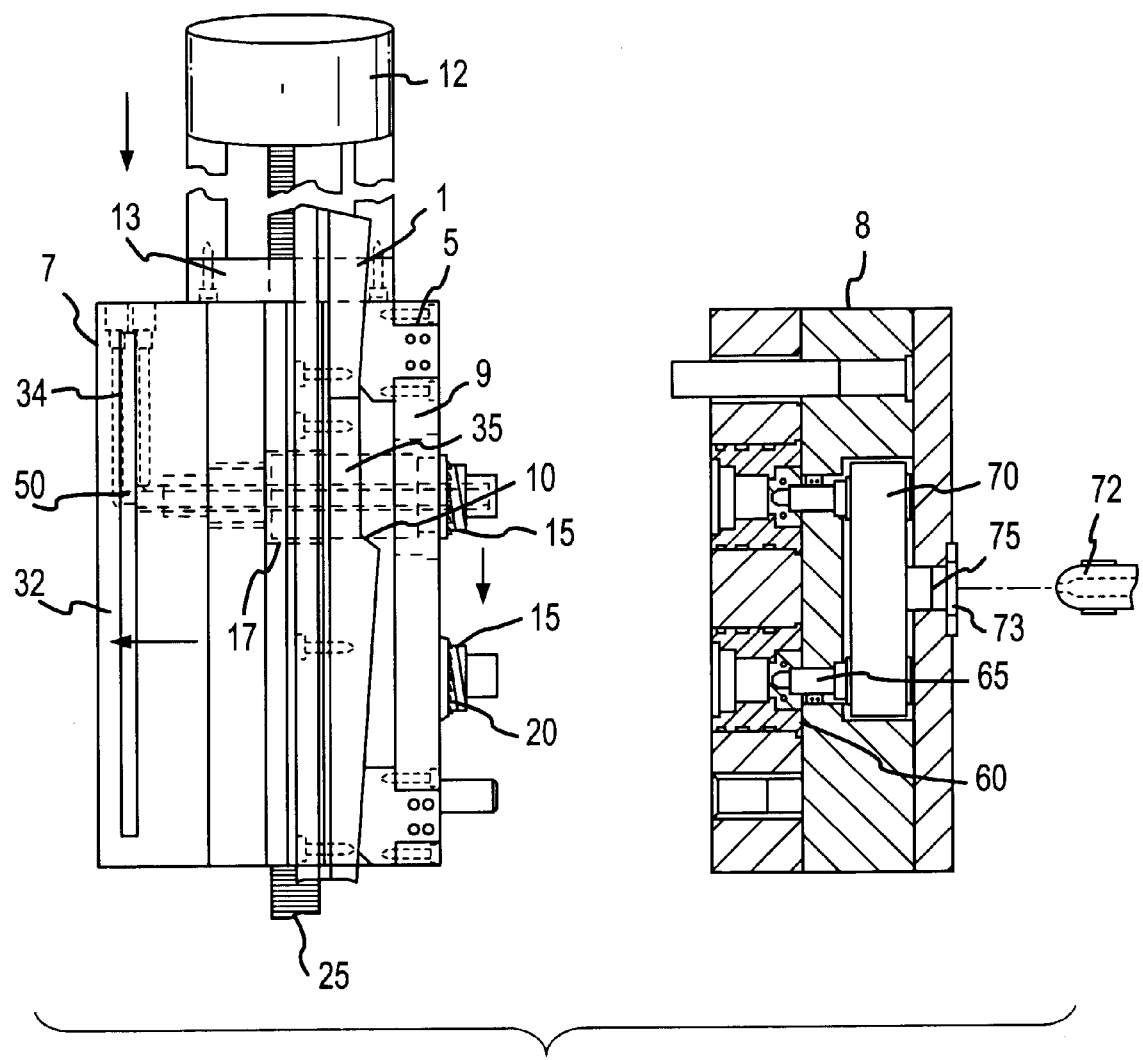
FIG. 1 is an open-mold, side view of an exemplary prior art apparatus for the injection molding of internally threaded articles.
Figure 2:
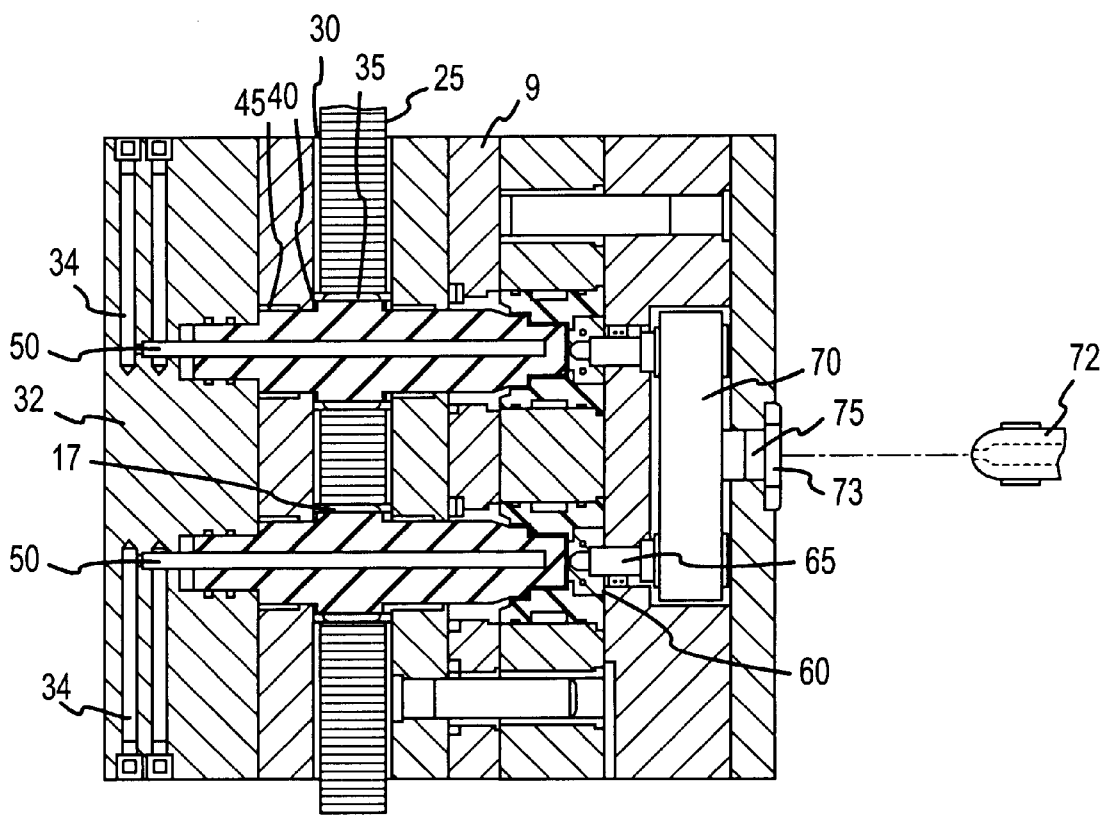
FIG. 2 is a closed-mold, side view of an exemplary prior art apparatus in accordance with the device depicted in FIG. 1.
Figure 3:
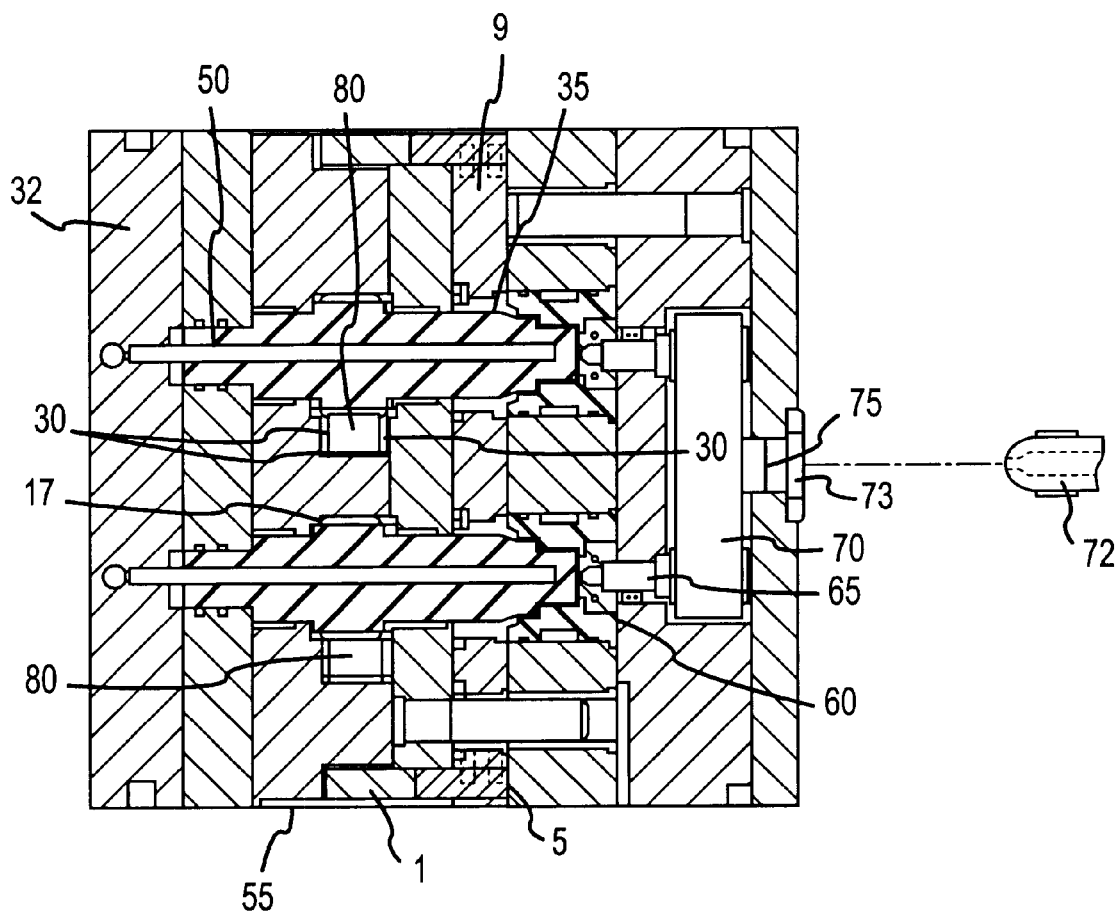
FIG. 3 is a closed-mold, end view of an exemplary prior art apparatus in accordance with the device depicted in FIG. 1 and FIG. 2.

Referring to FIGS. 1–4, an exemplary prior art molding apparatus is depicted. In an exemplary injection stage of the molding cycle, mold halves 7 and 8 are brought together in relative engagement to a closed-mold position suitably adapted to receive molten plastic (as depicted in FIGS. 2 and 3). A hot manifold 70 serves as a heating and distribution system for the plastic material to be injected into the mold and may be either standard or custom designed for the molding application of interest. Hot manifold 70 is generally employed to reduce runner waste and/or to deliver a more consistent melt temperature to distal portions of the mold in order to obtain better quality production of article parts 2. Manifold 70 feeds from a central injection nozzle-locating ring 73 for engagement with injection nozzle 72 and carries the plastic to each molding cavity or secondary runner system.

A manifold sprue bushing 75 generally provides a seat for the injection nozzle-locating ring 73 to align with the hot manifold 70 of the mold apparatus. Hot drops 65 (also termed "hot nozzles", "hot tips" or "hot probes") may be used with a manifold 70 or singularly in place of a sprue bushing 75. A hot drop 65 is generally comprised of a plastic feed hole, an electrical heating unit and a thermocouple and fits substantially flush to the hot manifold 70 in front of a mold cavity or a secondary runner system. Molten plastic material flows through the hot drop 65 to the outlet end or tip ("sharp point") where it then enters the mold cavity or runner thereby generally leaving a small gate mark on the molded article 2. Alternatively, a valve gate drop may be used in place of a hot drop 65 wherein a moving pin is interiorly disposed within the center of the drop whose backward and forward movement either hydraulically or pneumatically actuates the gate to open and closed positions. An exemplary reason for using a valve gate drop in place of a standard hot drop is to deliver higher plastic volume more rapidly into the mold cavity or to minimize gate vestige.

As molten plastic is injected into the apparatus, the liquid plastic flows to substantially fill the mold cavity thereby conforming the shape of the product article 2 to the design features of the mold. Thereafter, article 2 is cooled to allow the plastic to at least partially solidify, whereby the article 2 substantially retains the mold's design features and is suitably prepared for subsequent ejection from the mold. Coaxial bubbler tubes 50 are generally installed in the bottom clamp plate 32 to direct cooling water from the feed line 34 to the inside of core 35 to cool the article 2 prior to ejection from the mold. A water-cooled gate insert 60, generally used on hot runner molds, provides direct cooling at the article 2 and gate interface. Cooling of the continually heated gate area is generally required in order to facilitate shorter mold cycle times, minimize gate vestige and/or realize quality production of article parts 2.

Figure 4:
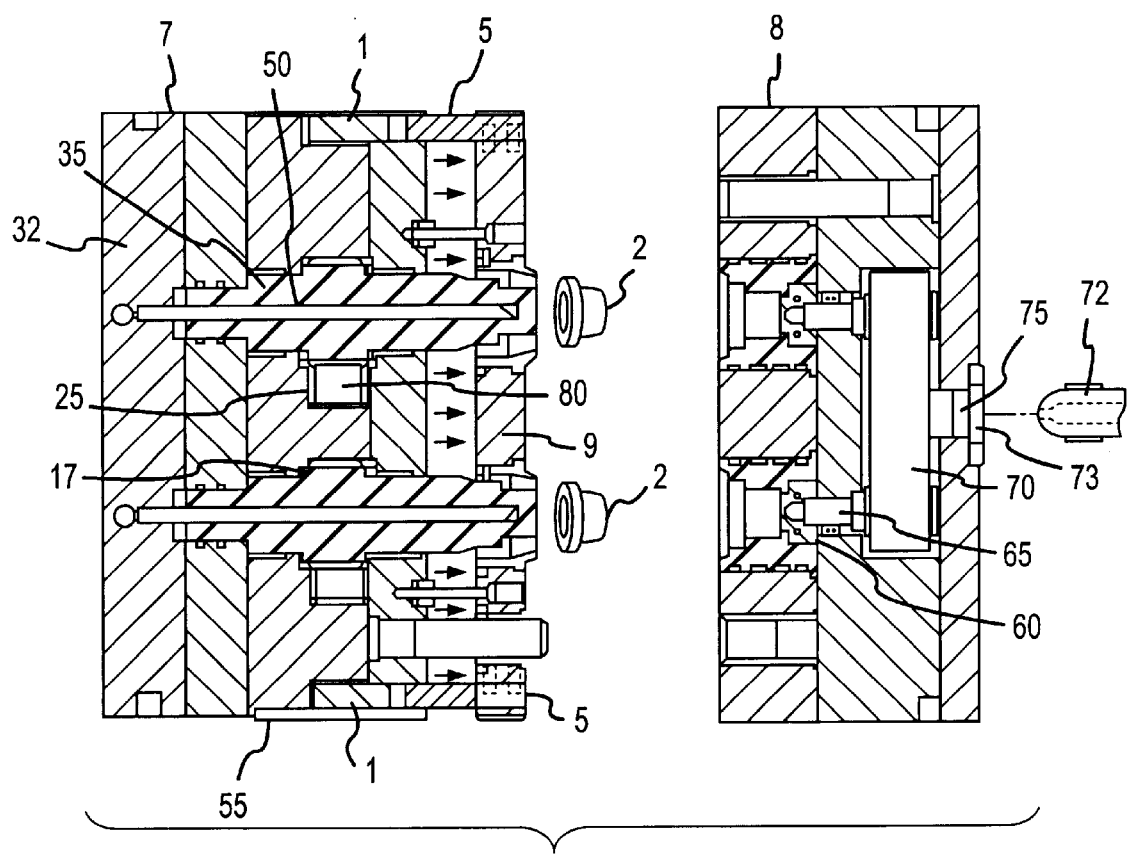
FIG. 4 is an open-mold, end view of an exemplary prior art apparatus in accordance with the device depicted in FIGS. 1–3 in a stripping position.

After article 2 is suitably cooled, in exemplary prior art devices, mold halves 7 and 8 are separated to expose the article 2 (as depicted in FIG. 4). Cam followers 5 then engage and ride cam bars 1 to begin removal of the molded article 2. Hydraulic cylinder 12, mounted on top of the mold, actuates cam bars 1 to lift cam followers 5 and stripper ("grabber") plate 9. Cam followers 5 are attached to stripper plate 9 and generally provide a hard, matching, angular surface to ride on the cam bar 1 and actuate stripper plate 9 to subsequently eject the article 2. Cam bars 1 generally are timed so that while the rotation of the unscrewing rack 25 operates to withdraw threaded core 35 from the article 2, stripper plate 9 is actuating at a suitable rate to remain in sufficient contact with the base of molded article 2 until the threads formed inside the article 2 have been unscrewed. Rack 25 and cam bars 1 may be actuated by the same hydraulic cylinder 12 and can be attached to a common drive plate 13. Rack 25 rotates the matching following gear 17 on threaded core 35 while the cam bars 1 lift stripper plate 9. Rack wear plates 30 are generally mounted on the three surrounding sides of the rack 25 that are not operationally engaged with the following gear 17 of the threaded core 35 and generally define the recess 80 for receiving the rack 25. The wear plates 30 provide a lubricated surface that may, in an exemplary preferred embodiment, be fabricated from non-ferrous material with grease-grooves machined into the plate 30 surfaces to allow rack 25 to move back and forth freely. Rack guide rails (not depicted) move independently of rack 25 to allow cams 1 to actuate core carrier plate 13 prior to rotational disengagement of threaded core 35 by action of engagement of rack drive 25 with core following gear 17.

Threaded core 35 is actuated by engagement of a following gear 17 with the linear drive mechanism 25. Threaded core 35 generally has threads exteriorly disposed on the molding end that form the interior threads of the article 2 and a matched pitch following thread on the opposing end of the threaded core and also generally incorporates a tapered shutoff seat as well as provisions for water cooling well known in the art of injection molding. Thrust-needle bearings 40 provide a smooth travel envelope for the core 35 to rotate inside. Each set of bearings 40 generally comprises two hardened thrust washers and one radial roller bearing. Generally, thrust washer thickness is critical in prior art devices for the accurate and resolved positioning of the threaded core 35. Thrust-needle bearings 40 absorb injection pressure as pressure is applied to the top of the threaded core 35 during the closed-mold injection stage of the molding cycle. Roller bearings 45 are press fitted into the rack plate 30 and generally provide stability, smooth rotation and alignment to the threaded core 35. While roller bearings 45 generally operate to hold the core 35 on its true centerline axis, thrust bearings 40 generally operate to stabilize the height position of the core 35 during rotation. Cam bar wear plates 55 generally surround the unengaged surfaces of the cam bars 1 to provide a lubricated surface for cam bars 1 to ride against in order to reduce metal-on-metal galling. Cam bar wear plates 55 may generally be fabricated in much the same fashion as rack wear plates 30, wherein the wear surface is generally manufactured from a non-ferrous metal or metal alloy that may be easily replaced during periodic maintenance if required.

After the unscrewing operation is generally completed, cam followers 5 are subsequently engaged with the acceleration ramps 10 of the cam bars 1 to displace the stripper plate 9, with a forward motion approximately normal to the interior face of the mold 7, to provide the final jarring force to the molded article 2, which dislodges the article 2 from the grabber teeth 20 (as depicted in FIG. 1). The grabber portion 20 of the stripper rings 15 generally form interrupted, ramping teeth annularly disposed around the perimeter, usually at the base of the molded article 2. These teeth 20 are generally biased to provide suitable resistance to torque at the base of the article 2 to prevent the article 2 from turning with the rotation of the withdrawing threaded core 35. The tapered portion of the grabber teeth 20 generally provides for easier final ejection of the molded article 2 after the unscrewing operation is completed.

After the article 2 is ejected from the mold, cam bars 1 are returned to their original position by reversing the hydraulic cylinder 12 before re-engaging the mold halves 7 and 8 into a closed-mold position, as depicted in FIG. 2, in preparation for the next injection molding cycle. For more information regarding injection molding, see "What is a Mold" (Len Graham, published by Tech Group, Inc., 2000), which is incorporated herein by reference.

Figure 5:
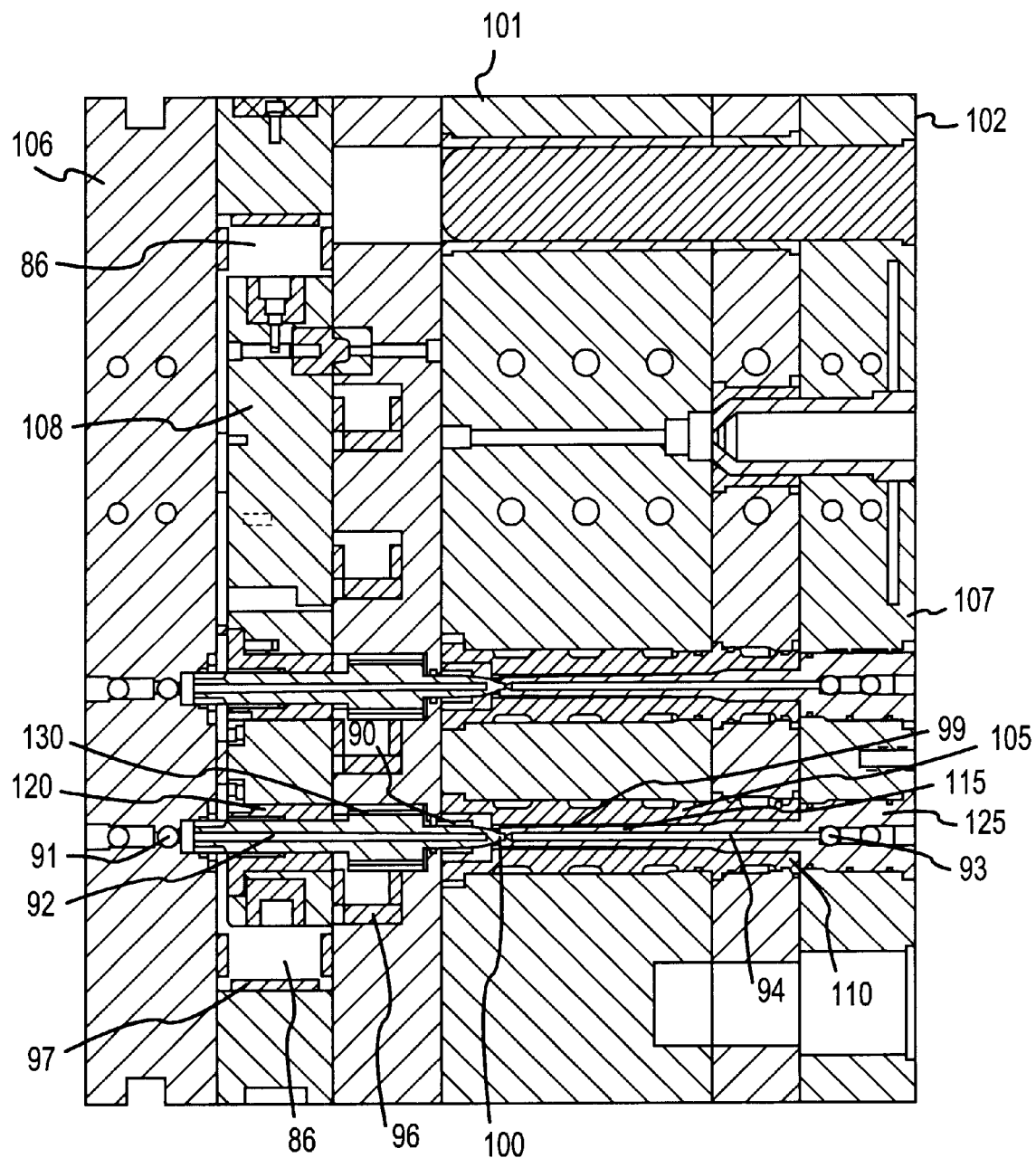
FIG. 5 is a closed-mold, end view of an exemplary apparatus for the injection molding of articles having internally disposed threads in accordance with one aspect of the present invention.
Figure 6:
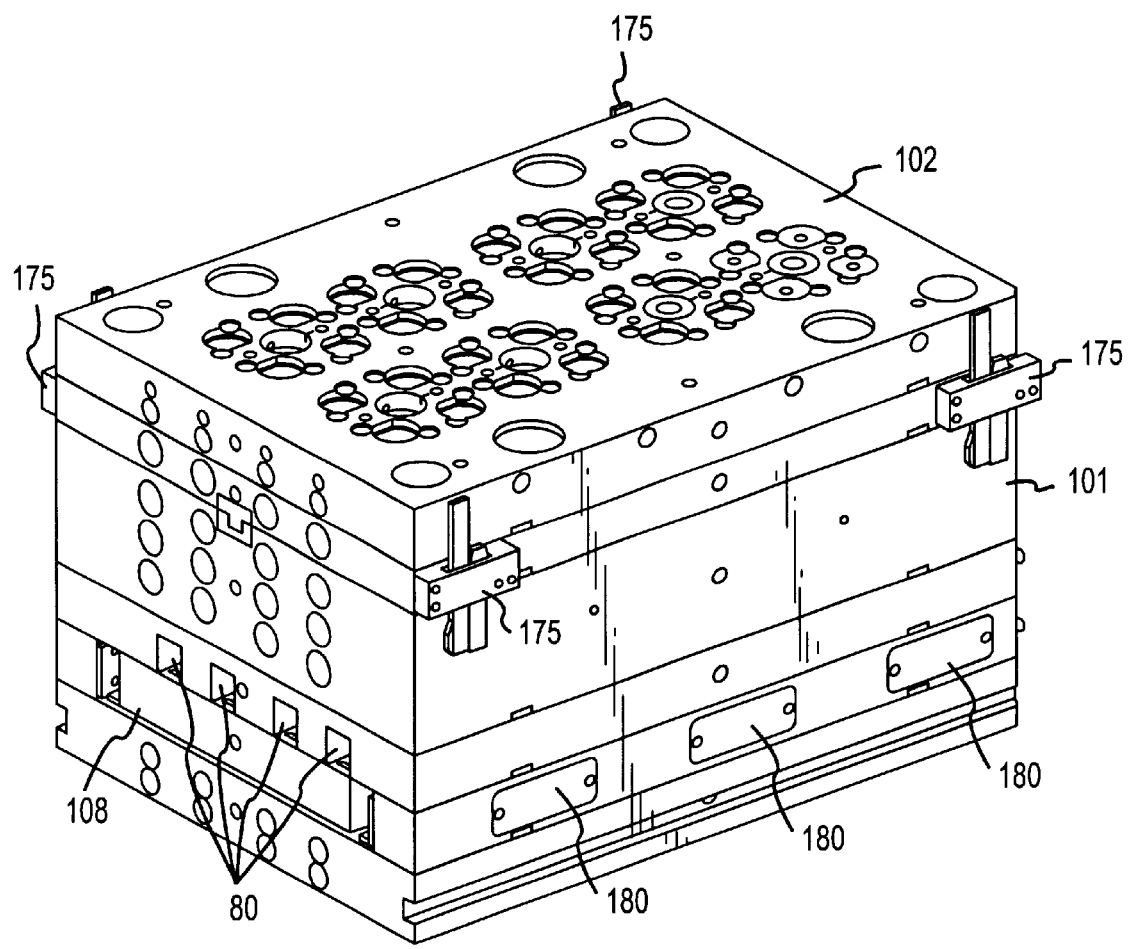
FIG. 6 is a perspective view of an exemplary mold in which the male and female halves have been engaged in their closed-mold configuration in accordance with one aspect of the present invention.
Figure 11:
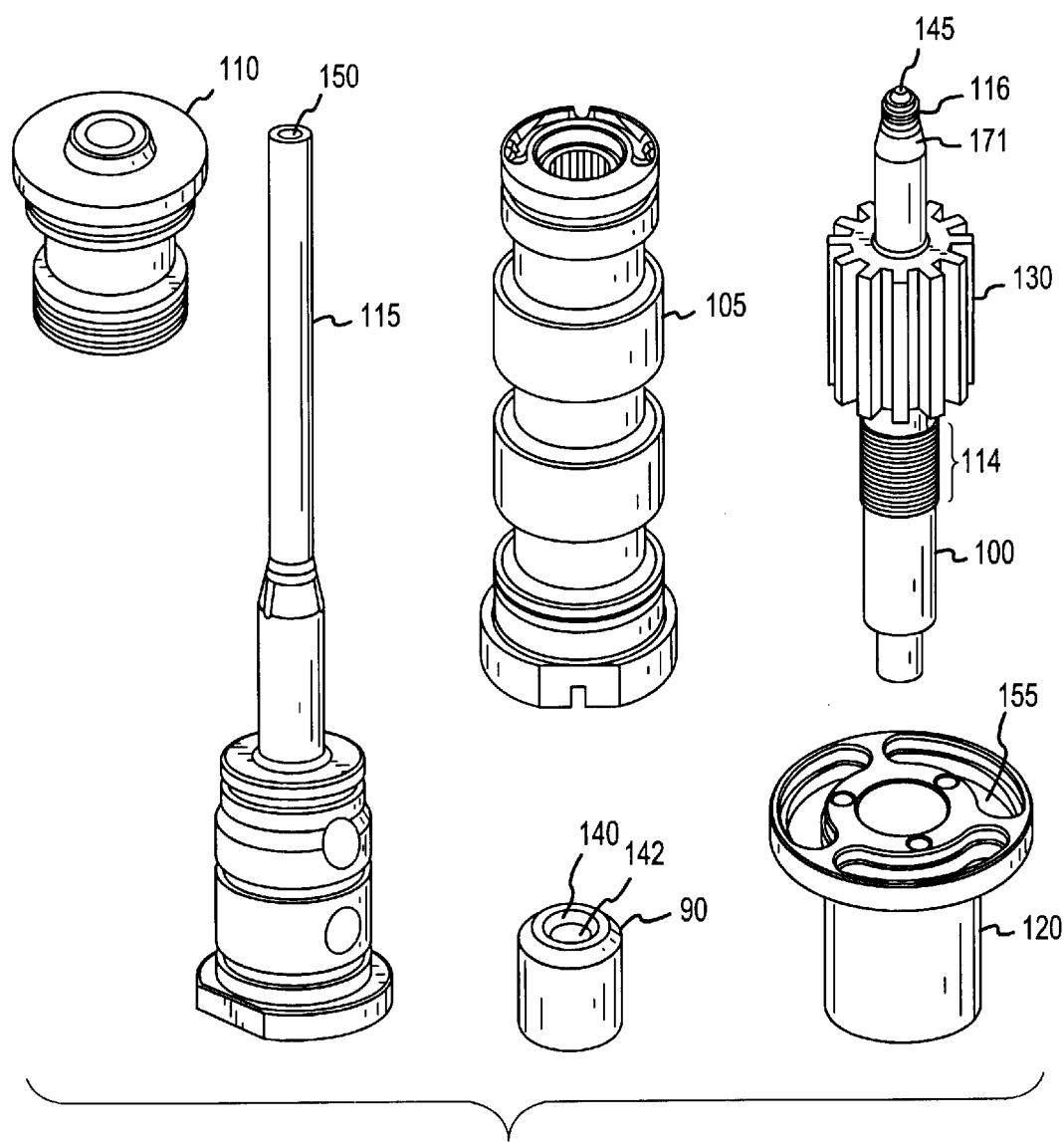
FIG. 11 is a perspective view of mold components generally defining an exemplary mold cavity in accordance with one aspect of the present invention.

FIGS. 5–12 depict an injection molding apparatus in accordance with one exemplary embodiment of the present invention. In the injection stage of the molding cycle, mold halves 101 and 102 are brought together in relative engagement and secured by means of latch locks 175 to a closed-mold position (see step 202 depicted in FIG. 13) suitably adapted to receive molten plastic (as depicted in FIGS. 5 and 6). Various exemplary methods of engaging the mold halves may include, but shall not be limited to: pneumatic means, hydraulic means, worm gear means, stepper-motor driven means, manual engagement means, camming mechanisms, electromotive means, etc. For example, a hot manifold heats and distributes molten plastic to mold cavity 99 (see step 201 depicted in FIG. 13). Mold cavity 99 is defined by, in an exemplary embodiment, the void volume between the threaded core 100, the main core 115 and the mold jacket housing 105 (as depicted in FIGS. 5 and 11). As in prior art devices, a hot manifold may be generally employed to reduce runner waste and/or to deliver a more consistent melt temperature to distal portions of the mold in order to obtain improved quality production of article parts 160. The manifold generally feeds from an injection nozzle (not shown) and carries the plastic to each molding cavity 99 by methods generally well known in the art of injection molding and previously described. Other methods of delivering plastic known in the art of injection molding, such as cold runner delivery systems, hot runners as well as combination methods such as cold-to-hot and hot-to-cold runner delivery systems, may also be used and shall be regarded as conceived and representative of alternative embodiments of the present invention.

As molten plastic is injected into the mold (see step 203 depicted in FIG. 13), the liquid plastic flows to substantially fill the mold cavity 99 thereby conforming the shape of the article 160 to the design features of the mold. Thereafter, the article 160 may be at least partially cooled to allow the plastic to solidify (see step 204 depicted in FIG. 13), whereby the article part 160 substantially retains the mold's design features and is suitably prepared for subsequent removal from the mold. Coaxial bubbler tubes 92 and 94 (as shown in FIG. 5) may be generally installed in the bottom clamp plates 106 and 107 of mold halves 101 and 102 respectively to direct cooling water from the feed lines 91 and 93 to the inside of threaded core 100 and main core 115 to cool the article 160 prior to ejection from the mold. A water-cooled gate insert may also be used on hot runner molds generally to provide direct cooling at the article 160 and gate interface. Other methods of cooling mold components and product parts known in the art of injection molding, such as thermal pins, bubbler tubes, barrels, drilled water lines, air jets, fans, heat sinks, insulation material, non-ferrous metals, etc., may also be used and shall be similarly regarded as conceived and representative of alternative embodiments of the present invention.

Threaded core receiver assembly 120 is mounted to threaded core carrier plate 108. As linear drive mechanism 111 is actuated, in an exemplary embodiment, threaded core carrier plate 108 rides on cam bars 109 to retract threaded core receiver assembly 120 and threaded core 100 in a preferred exemplary range of about 0.005–0.007 inches from article 160 under closed-mold clamp pressure. In an exemplary embodiment of the present invention, the closed-mold clamp pressure may be up to about $1*10^1$–$1*10^3$ tons. Acceptable retraction displacement values may range anywhere from about 0.001–0.015 inches depending on the desired product article geometry.

Figure 7:
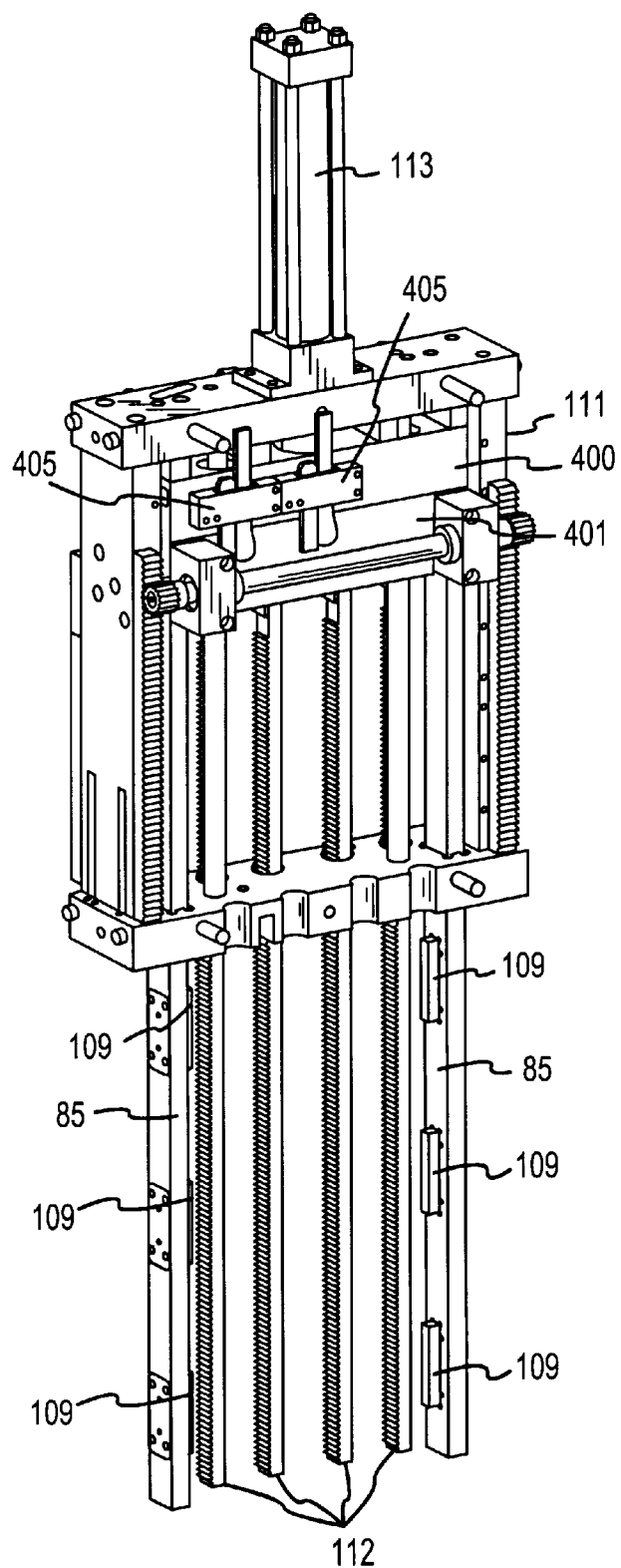
FIG. 7 is a forward perspective view of an exemplary linear drive mechanism for use with an exemplary mold as previously depicted in FIGS. 5 and 6 in accordance with one aspect of the present invention.
Figure 8:
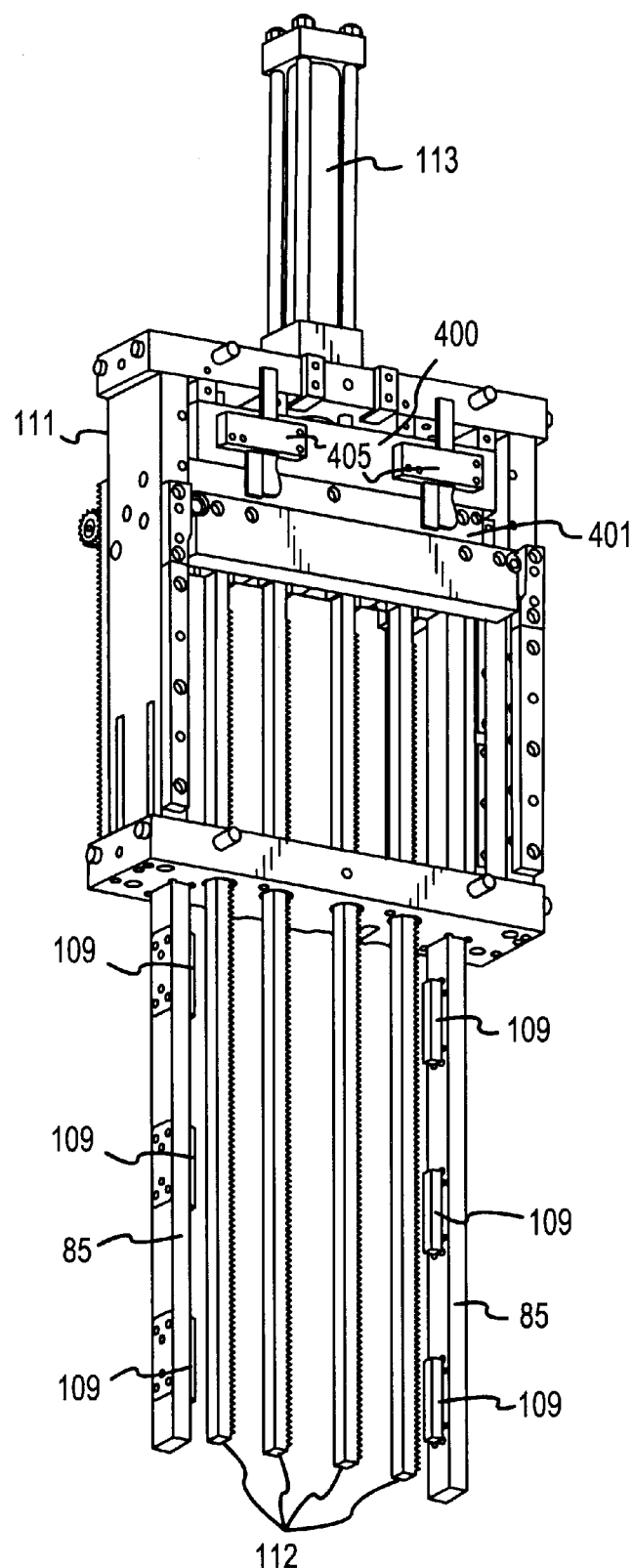
FIG. 8 is a rearward perspective view of an exemplary linear drive mechanism for use with an exemplary mold as previously depicted in FIGS. 5 and 6 in accordance with one aspect of the present invention.

In one exemplary embodiment, after article 160 is optionally cooled, cam-actuated threaded core carrier plate 108 is engaged by cam bars 109 disposed on linear drive mechanism 111 (as shown in FIGS. 7 and 8) to at least partially retract the threaded core 100 (see step 205 depicted in FIG. 13) from the main core 115. Maintenance access to the threaded core carrier plate 108 may be had by removal of panels 180. In another embodiment, core carrier plate 108 may be alternatively disposed on the opposing mold half to at least partially retract the main core 115 to substantially perform the same function and/or to substantially achieve a similar result of partial retraction of conical interlocks 145 and 171 of the threaded core 100 with the interlock recesses 150 and 142 of the main core 115 and the cavity sleeve 90.

In the mold set position, threaded core 100 is engaged with main core 115 by means of an interlocking mechanism that, in an exemplary embodiment, is generally comprised of a conical interlock 145 for relative engagement with a conical interlock recess 150; additionally, conical interior surface 171 is relatively engaged with conical interlock recess 142. The selection of a conical geometry for the interlocking features generally provides for suitably adapted alignment of the mold components with line-contact between the surfaces of engagement. This generally permits a free path of relative rotation of the threaded core 100 with respect to the main core 115 and cavity sleeve 90 as well as accurate and reproducible sealing of the shutoffs. In an alternative embodiment of the present invention, a spherical geometry for the interlocking features may also generally be used to provide a free path of relative rotation of the threaded core 100 with respect to the main core 115; however, use of a spherical geometry would generally provide for only point-contact between the surfaces of relative engagement. In yet other embodiments of the present invention, various polygonal geometries may be employed to provide surface contact between the surfaces of relative engagement, such as, for example, that of a tapered pyramidal section; however, not all polygonal geometries may provide a free path of rotation for the threaded core 100 with respect to the main core 115. In general, the taper of a polygonal interlock feature should be correlated to the magnitude of the linear retraction of the threaded core 100 to provide a suitable free path of rotation. While line-contact may be generally regarded as inferior to surface-contact in terms of securing positive, relative engagement between mold components, line-contact has generally been shown to provide an adequate interlock between the threaded core 100, the main core 115 and the cavity sleeve 90 while permitting linear retraction parameters to take on generally unconstrained values while providing a free path of rotation.

Threaded core following gear 130 engages linear rack 112 to begin unscrewing of threaded core 100 (see step 206 depicted in FIG. 13) from article 160 after the threaded core 100 has been at least partially retracted from engagement with main core 115 so as to reduce metal-on-metal galling that may otherwise result. In an alternative exemplary embodiment of the present invention, other methods of translational displacement of a core mold component under substantial closed-mold clamp pressure may also be used such as, for example: a spring actuated mechanism; a worm gear mechanism; electromotive and/or magnetically inductive means; etc.

Galling is generally defined as the undesirable stripping away of material, usually metal, when at least two bodies experience the application of relative force after the bodies have already come into contact with each other. In injection mold applications, galling of mold components may often be attributed to a physical property (e.g., the thermal expansion coefficient) of a metal or metal alloy used to construct the mold components. For example, the thermal expansion coefficient, which corresponds to the rate of linear growth of stainless steel λ as a function of temperature T, may generally be given as:

$$\frac{\partial \lambda}{\partial T} \cong 0.0006 \frac{\text{inches}}{\Gamma \times 100^\circ \text{ F.}}$$

. . . where Γ is the linear dimension of interest (here, in inches) for a stainless steel component. More generally stated, a stainless steel mold component could be expected to grow by about 0.0006 inches for every inch of steel that comprises the component for every 100 degrees Fahrenheit that the component is heated. In a typically hot runner molding system, mold and manifold temperatures can reach up to about 550° F., corresponding to a growth of about 0.0029 inches of the steel mold components as compared to the same components' dimensions at room temperature. Conical seat shutoff 171 and conical interlock 145 will therefore expand against their surfaces of relative engagement in the mold set position. This expansion will generally result in galling of the mold components as they experience rotation relative to one another in prior art devices under full clamp pressure. In an exemplary embodiment of the present invention, galling of the conical interlock 145 of the threaded core 100 with the interlock recess 150 of the main core 115 and conical interlock 171 with cavity sleeve 90 is virtually eliminated, or otherwise dramatically reduced, with the partial retraction (i.e., 0.005–0.007 inches) of the threaded core 100 prior to rotational disengagement with the article 160. This has the effect of substantially increasing the Mean Time Between Failure (MTBF) for these components and allows the mold apparatus to have a greater duty cycle between periodic maintenance and inspections procedures.

Because the threaded core 100 is partially retracted from main core 115 and cavity sleeve 90, the internal threads formed on article 160 experience displacement as the threaded core carrier plate 108 retracts the threaded core 100. In the case of a 0.005–0.007 inch partial retraction of the threaded core 100, prior to rotational disengagement of the article 160, it has been observed that suitable plastics (for example, but not limited to: nylon, polypropylene, polyethylene, polycarbonate, high-impact styrene, etc., and mixtures thereof) retain a memory of the stretched displacement of the threads and substantially re-adopt the conformation of the originally molded thread design parameters after the threaded core 100 has been unscrewed and removed from the article 106. Additionally, partial retraction of the threaded core 100 from the article 160 under substantial full, closed-mold clamp pressure allows for simultaneous cooling of the article 160 and commencement of removal of the same from the mold, which has the effect of substantially further reducing the mold cycle time allowing for improved rates of production of article parts 160 over time.

The linear drive unscrewing rack 112 and cam bars 109 attached to cam guide rails 85 are actuated by hydraulic cylinder 113. In alternative embodiments of the present invention, pneumatic means, worm gear means, stepper-motor driven means, manual engagement means, camming mechanisms, electromotive means, etc., may be generally substituted for hydraulic means 113 to perform substantially the same function and/or to achieve a substantially similar result of actuating unscrewing rack 112 and cam bars 109.

Figure 9:
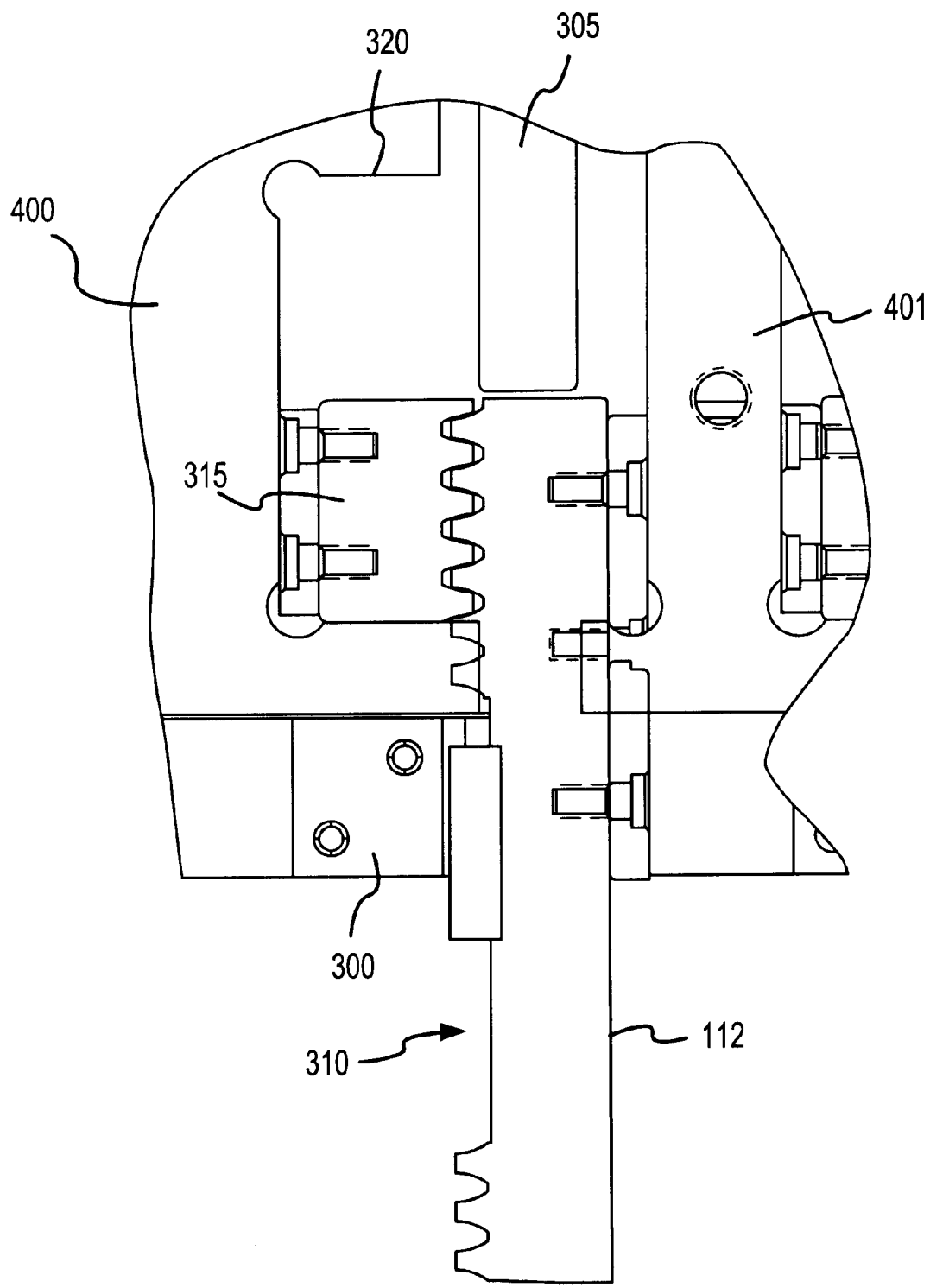
FIG. 9 is a cut-away side view of the linear drive, camming and core-rotation delay mechanisms for use with an exemplary mold as previously depicted in FIGS. 5 and 6 in accordance with one aspect of the present invention.
Figure 10:
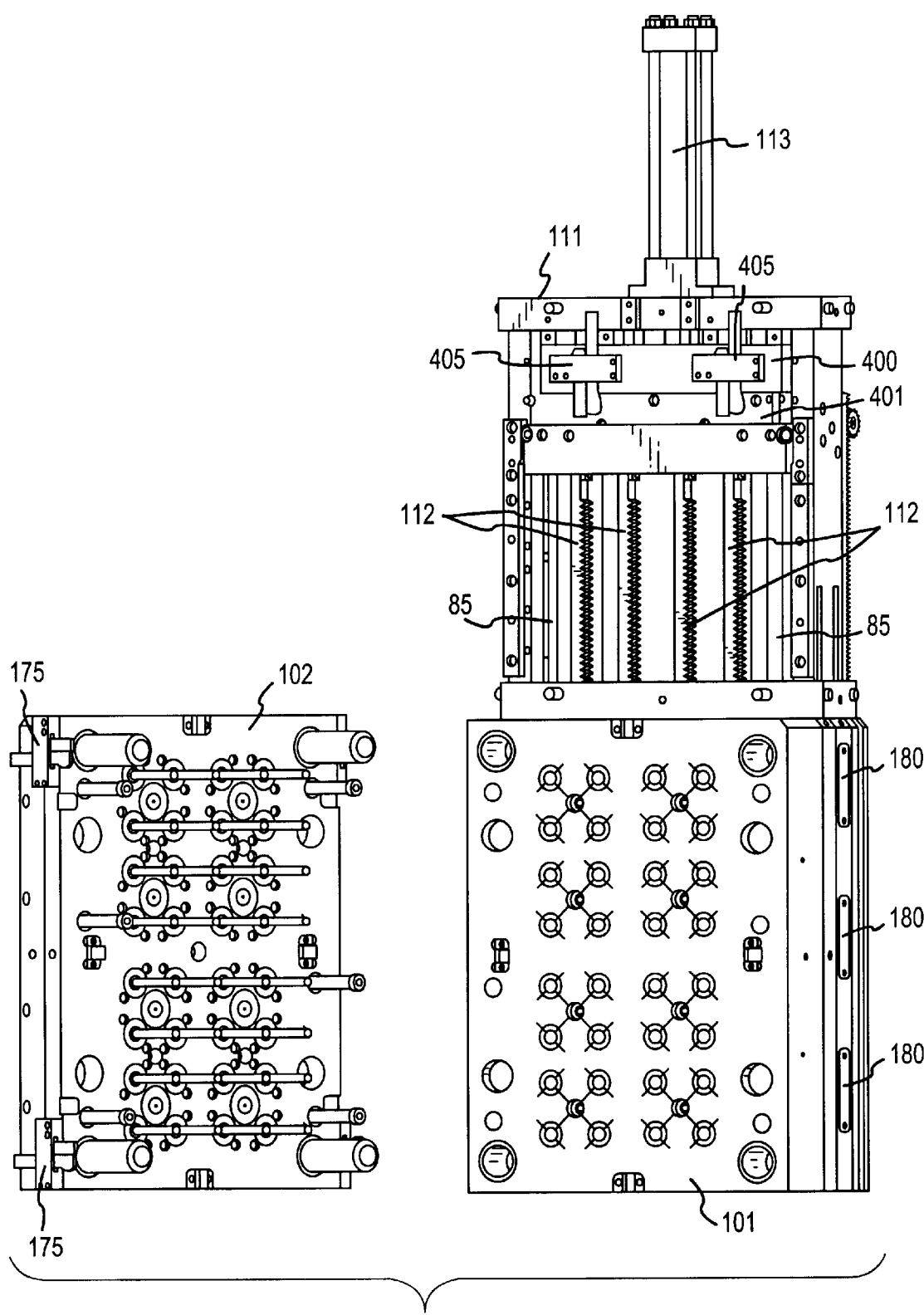
FIG. 10 is a perspective depiction of an exemplary apparatus in accordance with the present invention wherein the mold halves have been separated to expose their inner surfaces of relative engagement and wherein the linear drive has been engaged with the rotary gears of the threaded core components (not shown) housed within the female mold half.

FIG. 9 depicts an exemplary mechanism to provide for the delayed linear retraction of threaded core 100 from main core 115 and conical interlock 171 with cavity sleeve 90 followed by subsequent rotational disengagement of threaded core 100 from the product article 160 in accordance with one embodiment of the present invention. Hydraulic cylinder 113 is communicably connected and actuates rack drive plate 401, which is connected to and further actuates cam drive plate 400. Rack drive plate 401 and cam drive plate 400 are initially retained by at least one latch-lock 405. As rack drive plate 401 moves down, rack drive 112 remains stationary while cam drive plate 400 actuates linear displacement of cam drive rails 85 and cam bars 109. Cam bars 109, in turn, actuate displacement of threaded core carrier plate 108 to linearly retract the threaded core 100 under substantially full mold clamp pressure. As hydraulic cylinder 113 continues to actuate downward movement, cam drive rail 85 moves to close the distance between follower-block stop 320 and rack follower-block 315. As the distance between follower-block stop 320 and rack follower-block 315 is closed, latch-lock 405 disengages rack drive plate 401 from cam drive plate 400 and retaining block 300 engages retaining block recess 310 just prior to follower-block 315 making contact with follower-block stop 320. As hydraulic cylinder 113 continues to actuate the further downward movement of guide rail 85, engagement of retaining block 300 with the matched recess 310 assures that linear rack 112 does not return to its original position until the final set is made after the core re-set is complete in the upstroke. The continued downstroke of linear rack 112 actuates the rotation of following gear 130 to initiate rotational retraction of the threaded core 100 from the product article 160. Threaded core following-threads 114 are pitch-matched to the molding threads 116. Threaded core receiver assembly 120 is mounted to threaded core carrier plate 108 by means of mounting counter-bores 155, which are adapted for precise adjustment of the engagement of threaded core 100 with the core set conical interlock features previously described. Threaded core receiver assembly 120 has internally disposed threads for receiving threaded core 100 and provides for mounting of the threaded core 100 to threaded core carrier plate 108. As threaded core 100 rotates in response to the engagement of threaded core following gear 130 with linear rack 112, the matched pitch of the molding threads 116 with the core mounting threads 114 generally permits rotational disengagement of the molding threads 116 from the product article 160 while minimizing any stripping damage that might otherwise result. At some point in the downward movement of linear rack 112, threaded core 100 becomes substantially completely disengaged from product part 160. Thereafter, mold halves 101 and 102 may be separated to expose product part 160 for subsequent removal from main core 115. Either prior to reengagement of mold halves 101 and 102, or after their relative reengagement, hydraulic cylinder 113 may be reversed to return the mold to a core-set position, suitably prepared for the next injection mold cycle, by means of substantially reversing the order of the downstroke steps described above.

Rack wear plates 96 are generally mounted on the three surrounding sides of the rack 112 that are not operationally engaged with the following gear 130 of the threaded core 100. The wear plates 96 provide a lubricated surface that may be, in an exemplary embodiment, fabricated from non-ferrous material with grease-grooves machined into the plate 96 surfaces to allow rack 112 to move back and forth freely. Threaded core 100 is actuated by rotational engagement of following gear 130 with the linear rack mechanism 112. Rotation of threaded core 100 is stabilized and lubricated by an annularly engaged, oil-impregnated bronze bearing 140 disposed within cavity sleeve 90. Threaded core 100 generally has threads exteriorly disposed on the molding end that form the interior threads of the article 160 and also generally incorporates a tapered shutoff seat as well as provisions for water cooling well known in the art of injection molding.

Cam guide wear plates 97 are generally mounted on the three surrounding sides of the cam guide rails 85, which define the cam guide rail recess 86 and generally do not comprise surface area attributable to the threaded core carrier plate 108. The cam guide wear plates 97 also provide a lubricated surface that may be, in an exemplary embodiment, fabricated from non-ferrous material with grease-grooves machined into the plate surfaces to allow cam guide rails 85 to move back and forth substantially freely.

After the threaded core 100 is rotationally disengaged from the article 160, the mold halves 101 and 102 are separated to expose the article 160 (see step 207 depicted in FIG. 13). A stripper ring 110 is then displaced along the axis of the main core 115 with a forward motion approximately normal to the interior face of the mold 102, to dislodge the article 160 (see step 208 depicted in FIG. 13) from the mold (as depicted in FIG. 12). Other methods for ejecting a product part known in the art of injection molding, such as ejector pins, sleeve ejections, blades, air ejectors, post-mold ejectors, robotic ejectors, manual ejection means, etc., may also be used and shall be regarded as conceived and representative of alternative embodiments of the present invention.

In one exemplary embodiment of the present invention, after product article 160 is ejected from the mold, cam bars 109 and linear rack 112 may be optionally returned to their original positions by reversing the hydraulic cylinder 113 (see step 209 as shown in FIG. 13) before re-engaging mold halves 101 and 102 into a closed-mold position (as depicted in FIGS. 5 and 6) in preparation for the next injection molding cycle (returning to step 201 as depicted in FIG. 13). In an alternative embodiment, threaded core carrier plate 108 may be returned to the mold set position after re-engagement of mold halves 101 and 102.

The present invention offers substantial advantages and improvements over existing injection mold technology. Testing of the disclosed preferred exemplary device, in accordance with one embodiment of the present invention, showed no detectable signs of pressure contact or wear of the shutoffs after more than 70,000 production cycles of the mold.

Various principles and applications of the present invention have been described by way of the preceding exemplary embodiments; however, other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing or design parameters or other operating requirements without departing from the general principles of the same.

We claim:

1. A method for forming an article of manufacture having interiorly disposed threads comprising the steps of:

providing a first mold half having a surface for molding said molded article;

providing a second mold half having a surface for molding said molded article wherein said second mold surface is comprised of at least a translationally movable component that is at least partially threaded;

engaging said first mold half with said second mold half into a closed-mold configuration whereby a mold cavity is defined between said first mold half surface and said second mold half surface;

injecting plastic material into said mold cavity;

translationally displacing said movable component of said second mold surface while said first mold half is engaged with said second mold half in a closed-mold configuration;

providing means for at least partial rotational disengagement of said movable component of said second mold surface from the molded article after said movable component of said second mold surface has been translationally retracted from engagement with the first mold surface and while said first mold half is engaged with said second mold half in a closed-mold configuration;

disengaging said first mold half from said second mold half into an open-mold configuration; and ejecting said molded article from the mold cavity.

2. An apparatus for forming a threaded, molded article comprising:

a first mold half having a surface for molding said molded article;

a second mold half having a surface for molding said molded article wherein said second mold surface is comprised of at least a translationally movable component that is at least partially threaded;

means for engaging said first mold half with said second mold half into a closed-mold configuration whereby a mold cavity is defined between said first mold half surface and said second mold half surface;

means for injecting plastic material into said mold cavity;

means for translationally displacing said movable component of said second mold surface while said first mold half is engaged with said second mold half in a closed-mold configuration;

means for at least partial rotational disengagement of said movable component of said second mold surface from the molded article after said movable component of said second mold surface has been translationally retracted from engagement with the first mold surface and while said first mold half is engaged with said second mold half in a closed-mold configuration;

means for disengaging said first mold half from said second mold half into an open-mold configuration; and means for ejecting said molded article from the mold cavity.

3. An apparatus according to claim 2 for the injection molding of a plastic threaded article and ejection of the molded article formed therefrom, wherein said movable component of the second mold surface comprises a threaded mold core mounted to a mobile carrier plate.

4. An apparatus according to either of claim 2 or claim 3 for the injection molding of a plastic threaded article and ejection of the molded article formed therefrom, wherein said means for translationally displacing said movable component of the second mold surface comprises a cam follower connected to said movable component of said second mold surface for engagement with an actuated camming mechanism.

5. An apparatus according to claim 4, wherein said camming mechanism comprises an cam connected to a rack drive.

6. An apparatus according to claim 5, wherein said means for rotationally disengaging said threaded movable component of said second mold surface comprises a following gear engaged with said rack drive.

7. An apparatus according to claim 4, wherein said camming mechanism is actuated by a device selected from the group consisting of a hydraulic cylinder and a pneumatic cylinder.

8. An apparatus according to claim 2, wherein said ejection means comprises a stripper ring.

9. An apparatus according to claim 2, wherein said second mold surface further comprises an externally threaded mold core and said molded article comprises a closure with interiorly disposed threads.

10. An apparatus according to claim 9, where said threaded core has cooling channels disposed therein and means for introducing coolant into said channels.

11. An apparatus according to claim 9, wherein said apparatus includes a plurality of mold cavities.

12. An apparatus according to claim 11, wherein said apparatus includes a plurality of cam followers connected to said rack drive.

13. An apparatus according to claim 12, wherein said rack drive is actuated by a device selected from the group consisting of a hydraulic cylinder and a pneumatic cylinder.

* * * * *